United States Patent
Brauer

(10) Patent No.: US 10,504,213 B2
(45) Date of Patent: Dec. 10, 2019

(54) WAFER NOISE REDUCTION BY IMAGE SUBTRACTION ACROSS LAYERS

(71) Applicant: KLA-Tencor Corporation, Milpitas, CA (US)

(72) Inventor: Bjorn Brauer, Beaverton, OR (US)

(73) Assignee: KLA-Tencor Corporation, Milpitas, CA (US)

( * ) Notice: Subject to any disclaimer, the term of this patent is extended or adjusted under 35 U.S.C. 154(b) by 130 days.

(21) Appl. No.: 15/797,867

(22) Filed: Oct. 30, 2017

(65) Prior Publication Data

US 2018/0144442 A1    May 24, 2018

Related U.S. Application Data

(60) Provisional application No. 62/425,602, filed on Nov. 22, 2016.

(51) Int. Cl.
| | |
|---|---|
| *G06T 5/00* | (2006.01) |
| *G06K 9/62* | (2006.01) |
| *G06T 3/00* | (2006.01) |
| *G06T 5/50* | (2006.01) |
| *G06T 7/00* | (2017.01) |

(52) U.S. Cl.
CPC ............ *G06T 5/002* (2013.01); *G06K 9/6202* (2013.01); *G06T 3/0068* (2013.01); *G06T 5/50* (2013.01); *G06T 7/001* (2013.01); *G06T 2207/20224* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 5,859,698 | A | 1/1999 | Chau et al. |
| 5,943,437 | A | 8/1999 | Sumie et al. |
| 5,949,901 | A | 9/1999 | Nichani et al. |
| 6,040,912 | A | 3/2000 | Zika et al. |
| 6,140,140 | A | 10/2000 | Hopper |
| 6,200,823 | B1 | 3/2001 | Steffan et al. |
| 6,411,378 | B1 | 6/2002 | Pike et al. |
| 6,586,263 | B2 | 7/2003 | Muradian et al. |
| 7,295,695 | B1 | 11/2007 | Dayal |

(Continued)

FOREIGN PATENT DOCUMENTS

| | | |
|---|---|---|
| DE | 102011054537 A1 | 1/2012 |
| KR | 20150002964 A | 1/2015 |
| WO | 03003034 A1 | 1/2003 |

OTHER PUBLICATIONS

ISA/KR, International Search Report for PCT/US2017/062871 dated Mar. 12, 2018.

*Primary Examiner* — Mark Roz
(74) *Attorney, Agent, or Firm* — Hodgson Russ LLP

(57) ABSTRACT

Noise reduction in a difference image of an optical inspection tool is provided by calculating a difference image across layers of a multi-layered wafer. A first wafer image of a first wafer layer and a second wafer image of a second wafer layer are used. The first wafer image and the second wafer image are at a same planar location on the multi-layered wafer, but of different layers and/or after different process steps. A first difference image is calculated between the first wafer image and the second wafer image to reduce wafer noise. Defects can be identified using the first difference image. A system with an image data acquisition subsystem can be used to perform this technique.

5 Claims, 5 Drawing Sheets

(56) References Cited

U.S. PATENT DOCUMENTS

| | | |
|---|---|---|
| 7,504,642 B2 | 3/2009 | Hummel et al. |
| 7,665,060 B2 | 2/2010 | Luc-Pat et al. |
| 7,813,541 B2 | 10/2010 | Sali et al. |
| 8,121,395 B2 | 2/2012 | Hiroi et al. |
| 8,209,135 B2 | 6/2012 | Funakoshi et al. |
| 8,233,695 B2 | 7/2012 | Usui et al. |
| 8,605,275 B2 | 12/2013 | Chen et al. |
| 8,779,359 B2 | 7/2014 | Ogiso et al. |
| 2003/0048957 A1 | 3/2003 | Dai et al. |
| 2007/0130557 A1 | 6/2007 | Luk-Pat et al. |
| 2012/0044486 A1 | 2/2012 | Chen et al. |
| 2013/0304399 A1 | 11/2013 | Chen et al. |
| 2015/0003721 A1 | 1/2015 | Pettibone |

WAFER NOISE REDUCTION BY IMAGE SUBTRACTION ACROSS LAYERS

CROSS-REFERENCE TO RELATED APPLICATIONS

This application claims priority to U.S. Provisional Application No. 62/425,602, filed on Nov. 22, 2016, the disclosure of which is incorporated herein by reference.

FIELD OF THE DISCLOSURE

The present disclosure relates to reducing noise during defect detection.

BACKGROUND OF THE DISCLOSURE

Fabricating semiconductor devices, such as logic and memory devices, typically includes processing a substrate like a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and, thus, higher profits. Inspection has always been an important part of fabricating semiconductor devices such as integrated circuits (ICs). However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

As design rules shrink, however, semiconductor manufacturing processes may be operating closer to the limitation on the performance capability of the processes. In addition, smaller defects can have an impact on the electrical parameters of the device as the design rules shrink, which drives more sensitive inspections. As design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive. As such, determining which of the defects actually have an effect on the electrical parameters of the devices and the yield may allow process control methods to be focused on those defects while largely ignoring others. Furthermore, at smaller design rules, process induced failures may, in some cases, tend to be systematic. That is, process induced failures tend to fail at predetermined design patterns often repeated many times within the design. Elimination of spatially systematic, electrically relevant defects is important because eliminating such defects can have a significant overall impact on yield. Whether or not defects will affect device parameters and yield often cannot be determined from the inspection, review, and analysis processes described above since these processes may not be able to determine the position of the defect with respect to the electrical design.

Defect detection across multiple layers of a multi-layered wafer has proven problematic. Previous techniques relied on defect attributes or customized difference filters to reduce noise or nuisance. However, these techniques may not function well if the signal of the defect looks similar to noise or nuisance. For example, defect source analysis (DSA) type nuisance filtering is based on finding defects on the previous layer and filtering these out as nuisance on the next layer. This may only allow filtering of discrete previous layer nuisance events. This cannot handle random wafer noise, which requires a recipe to be maintained on the previous wafer layer to be constantly tuned when the process is changed.

Therefore, a new technique and system that provide reduced noise during defect detection is needed.

BRIEF SUMMARY OF THE DISCLOSURE

In a first embodiment, a method for noise reduction during defect identification in a multi-layered wafer is provided. The method comprises a second wafer scan of a second wafer layer disposed on a first wafer layer of the multi-layered wafer performed using an image data acquisition subsystem. The second wafer scan is converted into a second wafer image corresponding to the second wafer layer using the image data acquisition subsystem. A first wafer image and the second wafer image are received at a processor. The first wafer image is of the first wafer layer and the second wafer image and the first wafer image are at a same planar location on the multi-layered wafer. Image noise is reduced, using the processor, by calculating a first difference image between the first wafer image and the second wafer image. One or more defects are identified using the processor based on the first difference image.

The one or more defects may be detected if one or more pixels in the first difference image exceed a predetermined threshold.

A first wafer scan may be of an entirety of a surface of the first wafer layer. The first wafer image may be only a fraction of the entirety of the surface. The fraction of the entirety of the surface may be selected based on the location of the second wafer image.

In an instance, the method further includes comparing, using the processor, a contrast difference between the first wafer image and the second wafer image. Dynamic compensation is applied, using the processor, to either the first wafer image or the second wafer image if the contrast difference exceeds a predetermined threshold.

In an instance, the method further includes aligning, using the processor, the second wafer image with the first wafer image based on a wafer design file.

In an instance, the method further includes performing, using the image data acquisition subsystem, a first wafer scan of the first wafer layer. The first wafer scan is converted into the first wafer image corresponding to the first wafer layer using the image data acquisition subsystem.

In an instance, the method further includes receiving, at the processor, a first reference image corresponding to the first wafer layer at a different planar location on the multi-layered wafer from that of the first wafer image and the second wafer image. A second difference image between the first reference image and the first wafer image is calculated using the processor. A second reference image corresponding to the second wafer layer at a different planar location on the multi-layered wafer from that of the first wafer image and the second wafer image is received at the processor. A third difference image between the second reference image and the second wafer image is calculated using the processor. A fourth difference image between the second difference image and the third difference image is calculated using the processor. The fourth difference image may be compared against the first difference image using the processor to verify presence of the one or more defects.

In a second embodiment, a system for defect identification in a multi-layered wafer is provided. The system comprises an image data acquisition subsystem and a controller in electronic communication with the image data acquisition subsystem. The controller includes a processor configured to execute one or more software modules. The one or more software modules configured to: receive a first wafer image and a second wafer image; calculate a first difference image between the first wafer image and the second wafer image thereby reducing wafer noise; and identify one or more defects based on the first difference image. The first wafer image is of a first wafer layer of the multi-layered wafer. The second wafer image is of a second wafer layer disposed on the first wafer layer of the multi-layered wafer. The second wafer image and the first wafer image are at a same planar location on the multi-layered wafer. The image data acquisition subsystem may be configured to perform a wafer scan.

The one or more software modules may be further configured to: compare a contrast difference between the first wafer image and the second wafer image and apply dynamic compensation to either the first wafer image or the second wafer image if the contrast difference exceeds a predetermined threshold.

The one or more software modules may be further configured to align the second wafer image with the first wafer image based on a wafer design file.

In an instance, a first wafer scan may be of an entirety of a surface of the first wafer layer. The first wafer image may be only a fraction of the entirety of the surface. The one or more software modules may be further configured to select a fraction of the entirety of the surface based on the location of the second wafer image.

The one or more software modules are further configured to: receive a first reference image corresponding to the first wafer layer at a different planar location on the multi-layered wafer from that of the first wafer image and the second wafer image; calculate a second difference image between the first reference image and the first wafer image; receive a second reference image corresponding to the second wafer layer at a different planar location on the multi-layered wafer from that of the first wafer image and the second wafer image; calculate a third difference image between the second reference image and the second wafer image; and calculate a fourth difference image between the second difference image and the third difference image. The one or more software modules may be further configured to compare the fourth difference image against the first difference image to verify presence of the one or more defects.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments of the methods and systems disclosed herein provide noise reduction in a difference image of an optical inspection tool by calculating a difference image across layers of a multi-layered wafer. Detection of defects that previously were buried in the noise floor (e.g., that have a signal to noise ratio that is generally too low for detection) is enabled. This can improve defect detection results for semiconductor manufacturers and increase throughput. In particular, pattern related defects such as missing patterns, bridging defects which connect two metal lines, or mis-shapen patterns may benefit from techniques disclosed herein, though other types of defects also may benefit. A difference in appearance of the defect and the noise or nuisance in the difference image is not used to separate the defect of interest (DOI) from the noise or nuisance.

Figure 5:
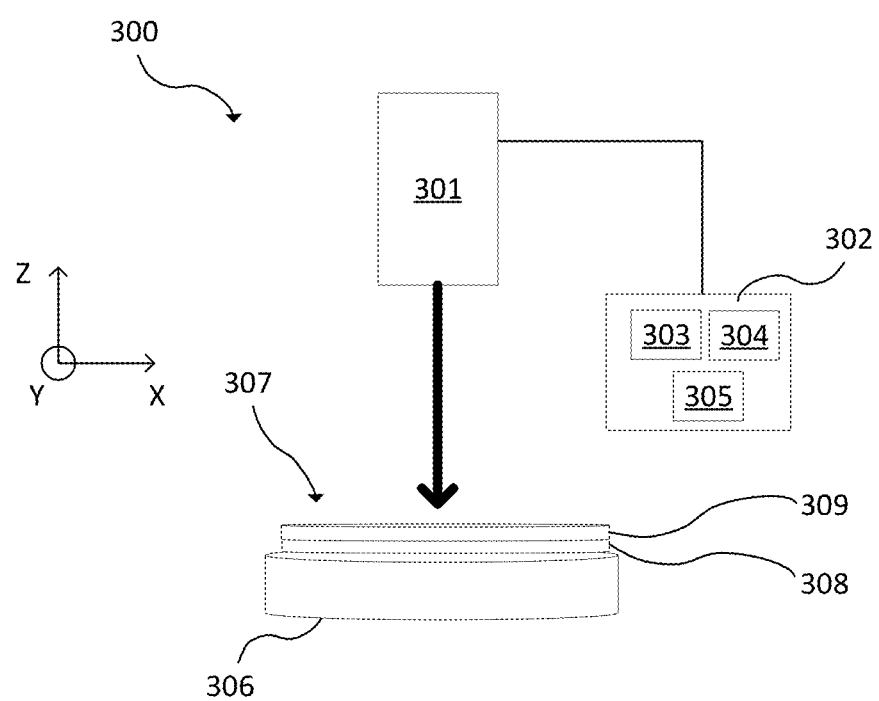
FIG. 5 is a block diagram of an embodiment of a system in accordance with the present disclosure.

FIG. 5 illustrates a multi-layered wafer 307 on a chuck 306. The multi-layered wafer 307 includes a first wafer layer 308 and a second wafer layer 309. The second wafer layer 309 is disposed on the first wafer layer 308. While only two layers are illustrated, the multi-layered wafer 307 can include three, four, five, or more layers on the wafer. The layers can be many steps apart. In an example not illustrated herein, a nuisance can be introduced in layer 25, the DOI can be introduced in layer 31, and the wafer can be inspected at layer 34 due to wafer processing optimization. In this example, the candidate image on layer 34 is compared to an image at the same location at layer 25 to 33. Thus, the first wafer layer 308 and the second wafer layer 309 may not be consecutive.

Process steps are implicated in the discussion of layers. In a particular example that is not illustrated herein, layer 2 may be layer 1 after oxide deposition, layer 3 may be layer 2 after oxide etch, layer 4 may be layer 3 after metal deposition, and layer 5 may be layer 4 after polishing. Thus, the second wafer layer 309 can be a modified version of the first wafer layer 308 and/or may include additional material compared to first wafer layer 308.

A full wafer recording can be performed on the first wafer layer 308, which can be an inspection step before the defect is introduced but which contains a sample of random wafer noise such as critical dimension (CD) variation, line edge roughness (LER), and previous layer defects. The multi-layered wafer 307 is processed further, a defect can be introduced, and then the multi-layered wafer 307 reaches the next inspection step of the second wafer layer 309 on which the defect is visible in the optical patch.

An inspection can be performed on the second wafer layer 309 and a difference image can be calculated from the image of the second wafer layer 309 and the image taken at the same location on the first wafer layer 308.

Figure 1:
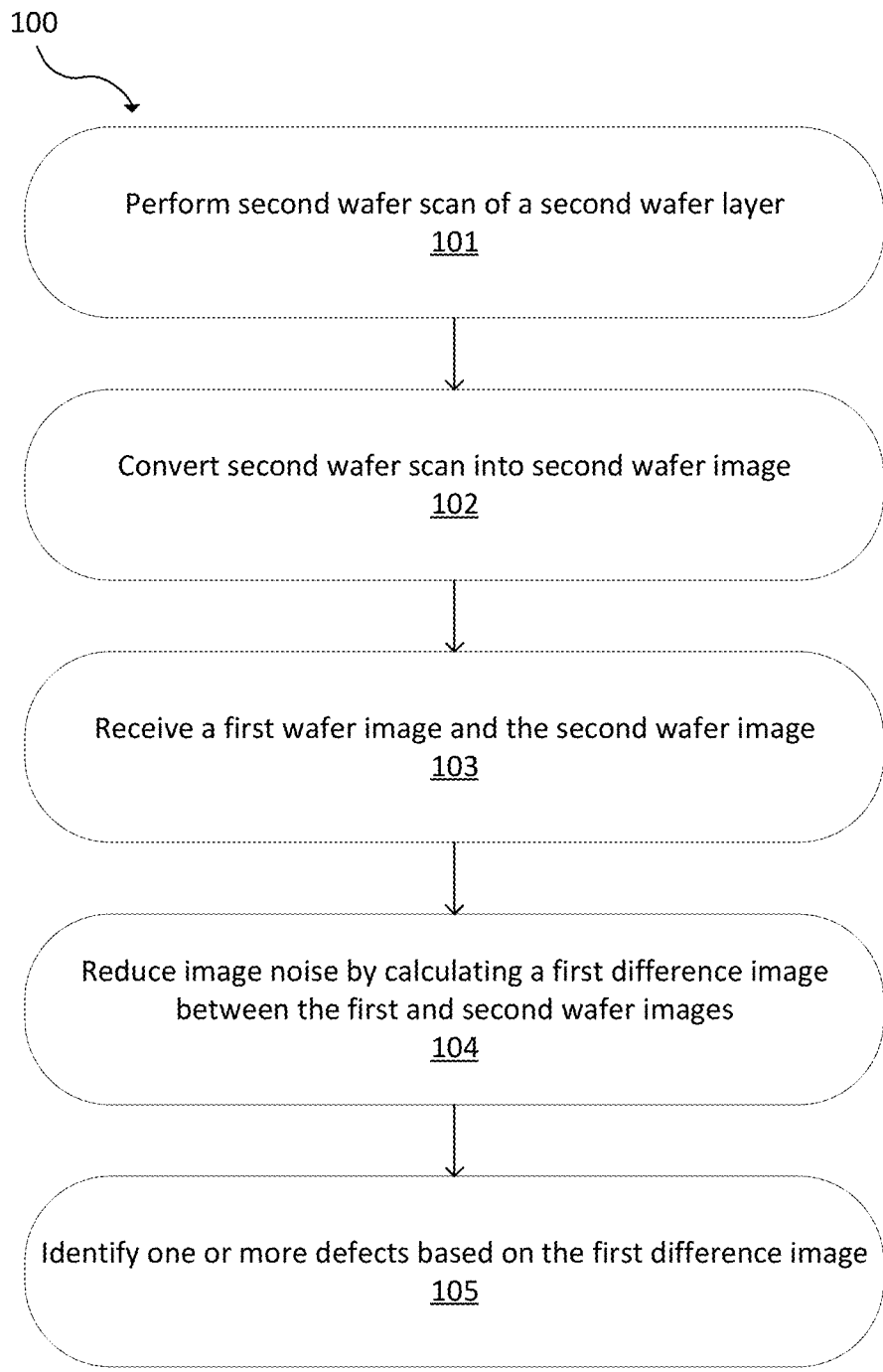
FIG. 1 is a flowchart illustrating an embodiment of a method in accordance with the present disclosure.

FIG. 1 is a flowchart illustrating an embodiment of a method 100 that can be used for noise reduction during defect identification in a multi-layered wafer.

At 101, a second wafer scan of a second wafer layer is performed, such as using an image data acquisition subsystem. The second wafer layer is disposed on a first wafer layer of the multi-layered wafer. The second wafer layer may be an additional layer formed on the first wafer layer, but also may be a modified section of the first wafer layer (e.g., an etched region on the first wafer layer). At 102, the second wafer scan is converted into a second wafer image corresponding to the second wafer layer, such as using the image data acquisition subsystem.

While the patch images shown after defect detection may only be 32×32 pixels$^2$ in size, the frame used before detection may be on the order of 1 k×1 k pixels$^2$. This size can help provide a highly accurate alignment between the image of the current and the image of the previous layer. Bigger frames may provide enough features to allow highly accurate image alignment.

At 103, a first wafer image and the second wafer image are received, such as at a processor. The first wafer image is of the first wafer layer. The second wafer image and the first wafer image can be at a same planar location on the multi-layered wafer. The first wafer image and the second wafer image may be of at least some of the same X-Y coordinates of the planar face of the wafer.

The second wafer image and the first wafer image can be aligned based on a wafer design file or other techniques. For example, design-based alignment may be used for recording the wafer on the first wafer layer and for inspecting the wafer on the second wafer layer to help with image alignment.

In an instance, a first wafer scan may be of an entirety of a surface of the first wafer layer. The first wafer image may be only a fraction of the entirety of the surface. The fraction of the entirety of the surface may be selected based on the location of the second wafer image.

In another instance, a first wafer scan of the first wafer layer is performed, such as using the image data acquisition system. The first wafer scan is converted into the first wafer image corresponding to the first wafer layer, such as using the image data acquisition subsystem.

At 104, image noise is reduced by calculating a first difference image between the first wafer image and the second wafer image, such as using the processor. One or more defects are identified at 105 based on the first difference image, such as using the processor. One or more defects can be detected if one or more pixels in the first difference image exceed a predetermined threshold. This calculated difference has an improved signal-to-noise because previous layer nuisance and random wafer noise is reduced or eliminated.

In an instance, the signal to noise could go from <1 for within layer inspection to 2 to 5 for across layer inspection if all the noise comes from the previous layer. Thus, the defects can go from not detectable to easily detectable.

Contrast between the first wafer image and the second wafer image can be compared. Dynamic compensation can be applied to either the first wafer image or the second wafer image if the contrast difference exceeds a predetermined threshold. The processor can compare contrast and apply dynamic compensation. Dynamic compensation can be applied when calculating the difference image.

In an instance, a first reference image corresponding to the first wafer layer at a different planar location on the multi-layered wafer from that of the first wafer image and the second wafer image is received, such as at the processor. A second difference image is calculated between the first reference image and the first wafer image, such as using the processor. A second reference image corresponding to the second wafer layer at a different planar location on the multi-layered wafer from that of the first wafer image and the second wafer image is received, such as at the processor. A third difference image is calculated between the second reference image and the second wafer image, such as using the processor. A fourth difference image can be calculated between the second difference image and the third difference image, such as using the processor. The fourth difference image can be compared against the first difference image to verify presence of the one or more defects, such as using the processor. This technique may be used if the candidate image of the current layer cannot be simply subtracted from the image at the same location at the previous layer due to, for example, a difference in contrast between the image in the current and the previous layer. In this instance, the difference of the difference image of the current layer and the difference image of the previous layer may be calculated. If there is a defect visible, it may be unclear if this defect is in the candidate or in the reference image. Double detection can be used to determine which image the defect actually is in.

In an example, a virtual inspector can be used to record one entire wafer. Difference image calculation can be performed on the second wafer layer using double detection. If a defect is found which exceeds the threshold, the difference image is compared to the difference image from the first wafer layer with the same location of the test or reference image of the current layer. If a pixel in the inter-layer difference image is exceeding the threshold a defect is reported.

Figure 2:
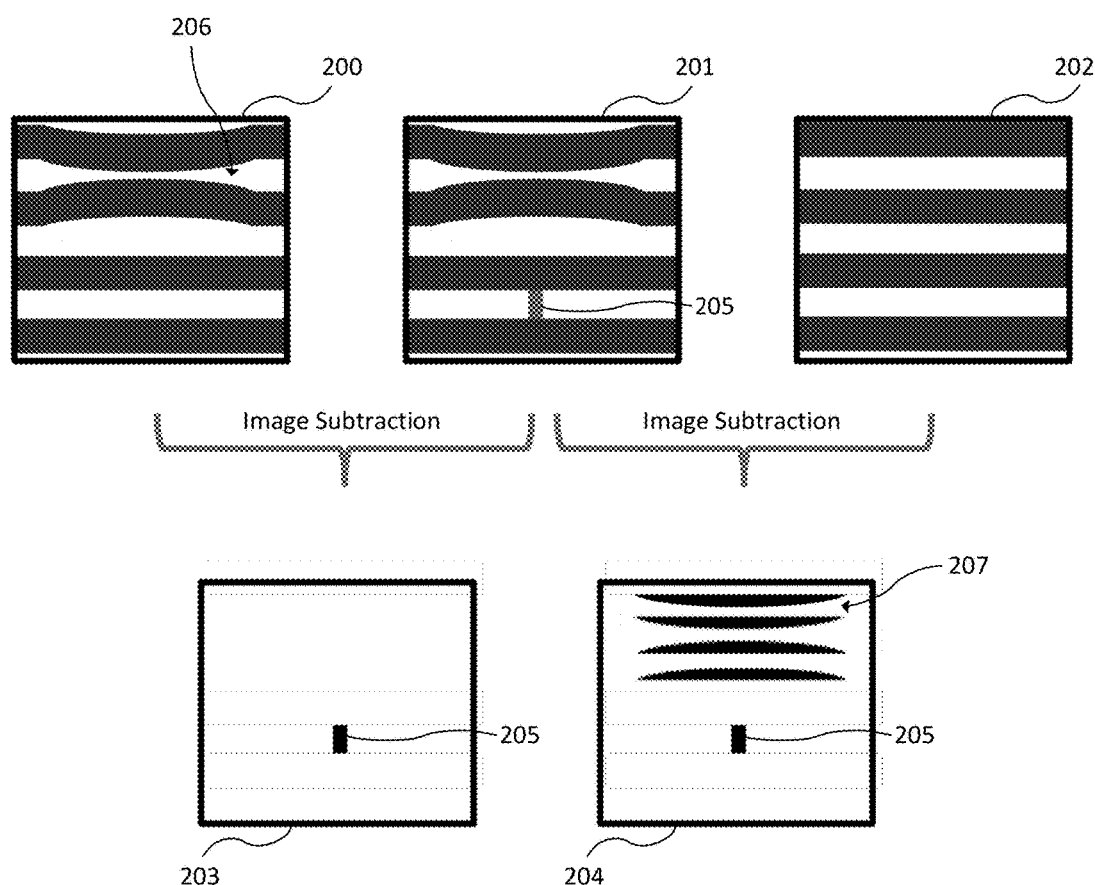
FIG. 2 illustrates an embodiment of inter-layer defect inspection.

FIG. 2 illustrates an embodiment of inter-layer defect inspection. First wafer image 200 of the first wafer layer and second wafer image 201 of the second wafer layer correspond to the same region of the multi-layered wafer. Thus, the first wafer image 200 is a view of the first wafer layer where the defect 205 occurs on the second wafer layer seen in the second wafer image 201. Second reference image 202 is of the second wafer layer of the multi-layered wafer, but in a different location on the wafer surface. For example, second reference image 202 may be of the next die relative to the second wafer image 201.

As seen in the first wafer image 200, CD variation 206 causes wafer noise. The defect 205 can be seen in the second wafer image 201. The difference image 204 of the second wafer image 201 and the second reference image 202 can result in a noisy difference image which shows the defect 205 with noise 207. It may not be possible to easily detect the defect with a noisy difference image. The first difference image between the first wafer image 200 and the second wafer image 201 shows the defect 205 with less or without the same type of noise.

Figure 3:
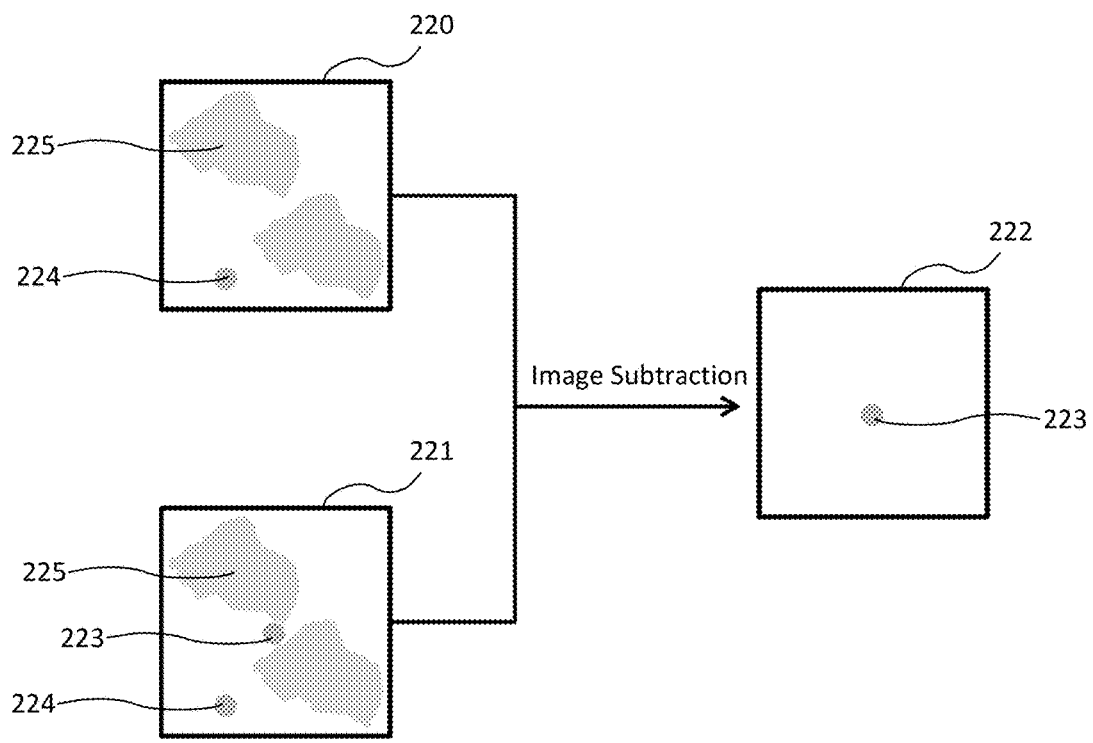
FIG. 3 illustrates another embodiment of inter-layer defect inspection.

FIG. 3 illustrates another embodiment of inter-layer defect inspection. Difference image 220 is the result of image subtraction of a first wafer image and a first reference image, both of the first wafer layer. Difference image 221 is the result of image subtraction of a second wafer image and a second reference image, both of the second wafer layer. The difference image 221 includes the defect 223. Both the difference image 220 and difference image 221 include random wafer noise 225 and a previous layer defect 224 that originated before the first wafer layer. Image subtraction of the difference image 220 and difference image 221 results in the difference image 222, which shows the defect 223 with improved signal-to-noise ratio. Use of difference images in the embodiment of FIG. 3 can reduce noise in the final difference image, which improves defect detection.

Figure 4:
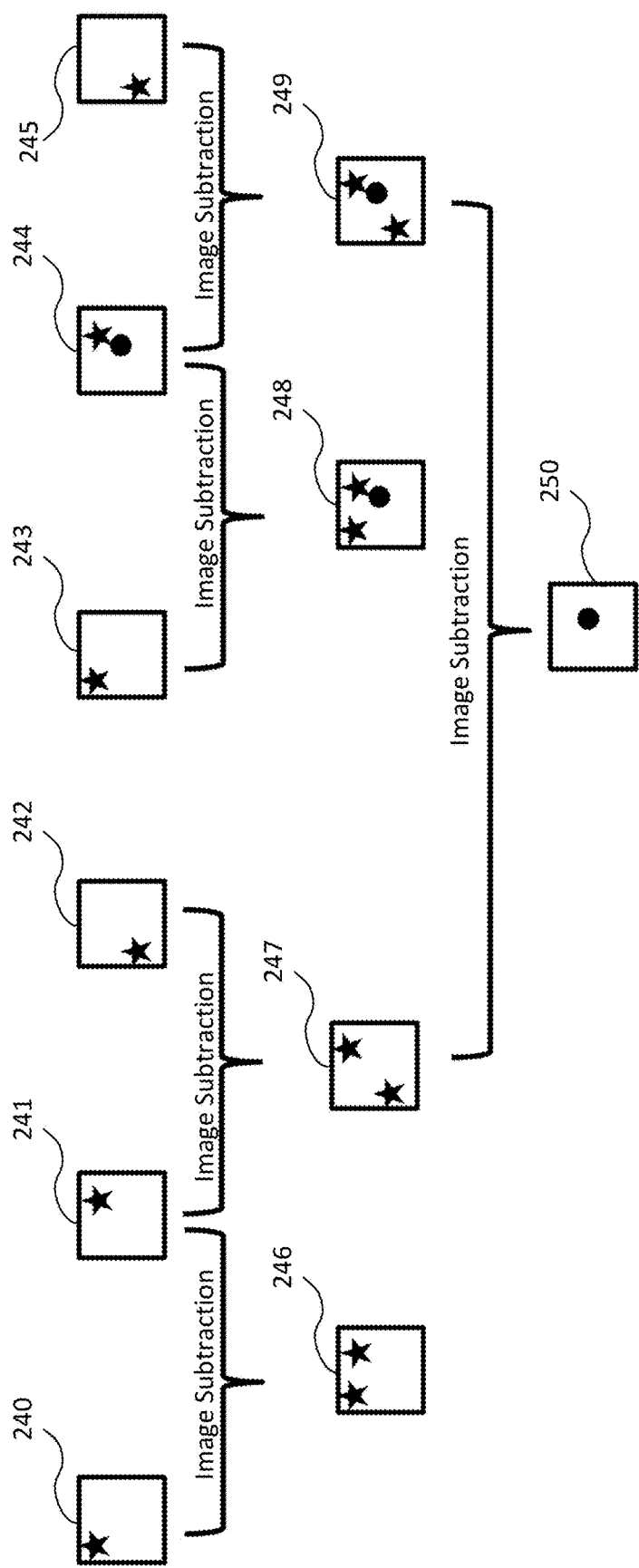
FIG. 4 illustrates another embodiment of inter-layer defect inspection using double detection.

FIG. 4 illustrates another embodiment of inter-layer defect inspection using double detection. In FIG. 4, the stars represent random wafer noise and the circle represents a defect. The first wafer image 241 of the first wafer layer is illustrated with a first reference image 242 at a different planar location on the first wafer layer, such as the next die. Another reference image 240 on the first wafer layer also is included. The second wafer image 244 of the second wafer layer is illustrated with the second reference image 245 at a different planar location on the second wafer layer, such as the next die. Another reference image 243 of the second wafer layer also is included. Image subtraction forms the difference images 246-249. The second difference image 247 and third difference image 249 are then used in image subtraction to form the fourth difference image 250, which shows the defect. The fourth difference image can be compared against the first difference image formed between the first wafer image 241 and second wafer image 244 to verify presence of the one or more defects. The defect may then be reported.

Difference images 240, 243, 246, and 248 may be used for double detection as needed.

FIG. 5 is a block diagram of an embodiment of a system 300. The system 300 includes a chuck 306 configured to hold a multi-layered wafer 307 or other workpiece. The chuck 306 may be configured to move or rotate in one, two, or three axes. The chuck 306 also may be configured to spin, such as around the Z-axis.

The system 300 also includes an image data acquisition subsystem 301 configured to measure a surface of the multi-layered wafer 307. The image data acquisition subsystem 301 may produce a beam of light, a beam of electrons, broad band plasma, or may use other techniques to measure a surface of the multi-layered wafer 307. In one example, the image data acquisition subsystem 301 includes a laser. In another example, the system 300 is a broad-band plasma inspection tool. The image data acquisition subsystem 301 can provide images of dies on the multi-layered wafer 307 or can provide information used to form images of dies on the multi-layered wafer 307. The image data acquisition subsystem 301 can be configured to perform a wafer scan, such as through relative movement between the image data acquisition subsystem 301 and the chuck 306.

The system 300 communicates with a controller 302. For example, the controller 302 can communicate with the image data acquisition subsystem 301 or other components of the system 300. The controller 302 can include a processor 303, an electronic data storage unit 304 in electronic communication with the processor 303, and a communication port 305 in electronic communication with the processor 303. It is to be appreciated that the controller 302 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 302 to implement various methods and functions may be stored in controller readable storage media, such as a memory in the electronic data storage unit 304, within the controller 302, external to the controller 302, or combinations thereof.

The controller 302 can include one or more processors 303 and one or more electronic data storage units 304. Each processor 303 may be in electronic communication with one or more of the electronic data storage units 304. In an embodiment, the one or more processors 303 are communicatively coupled. In this regard, the one or more processors 303 may receive readings received at the image data acquisition subsystem 301 and store the reading in the electronic data storage unit 304 of the controller 302. The controller 302 may be part of the system itself or may be separate from the system (e.g., a standalone control unit or in a centralized quality control unit).

The processor can be configured to execute one or more software modules. In an instance, these software modules can be configured to receive a first wafer image and a second wafer image. The first wafer image is of a first wafer layer of the multi-layered wafer. The second wafer image is of a second wafer layer disposed on the first wafer layer of the multi-layered wafer. The second wafer image and the first wafer image are at a same planar location on the multi-layered wafer. The one or more software modules can be configured to calculate a first difference image between the first wafer image and the second wafer image thereby reducing wafer noise. The one or more software modules can be configured to identify one or more defects based on the first difference image.

The one or more software modules can be further configured to compare a contrast difference between the first wafer image and the second wafer image and apply dynamic compensation to either the first wafer image or the second wafer image if the contrast difference exceeds a predetermined threshold.

The one or more software modules can be further configured to align the second wafer image with the first wafer image based on a wafer design file.

In an instance, a first wafer scan is of an entirety of a surface of the first wafer layer. The first wafer image may be only a fraction of the entirety of the surface. The one or more software modules can be further configured to select a fraction of the entirety of the surface based on the location of the second wafer image.

The one or more software modules can be further configured to receive a first reference image corresponding to the first wafer layer at a different planar location on the multi-layered wafer from that of the first wafer image and the second wafer image. The one or more software modules can be configured to calculate a second difference image between the first reference image and the first wafer image. The one or more software modules can be configured to receive a second reference image corresponding to the second wafer layer at a different planar location on the multi-layered wafer from that of the first wafer image and the second wafer image. The one or more software modules can be configured to calculate a third difference image between the second reference image and the second wafer image. The one or more software modules can be configured to calculate a fourth difference image between the second difference image and the third difference image. The one or more software modules can be further configured to compare the fourth difference image against the first difference image to verify presences of the one or more defects.

The controller 302 may be coupled to the components of the system 300 in any suitable manner (e.g., via one or more transmission media, which may include wired and/or wireless transmission media) such that the controller 302 can receive the output generated by the system 300, such as output from the image data acquisition subsystem 301. The controller 302 may be configured to perform a number of functions using the output. For instance, the controller 302 may be configured to perform defect detection on the multi-layered wafer 307. In another example, the controller 302 may be configured to send the output to an electronic data storage unit 304 or another storage medium without reviewing the output. The controller 302 may be further configured as described herein.

The controller 302, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The system 300 may be part of a defect review system, an inspection system, a metrology system, or some other type of system. Thus, the embodiments disclosed herein describe some configurations that can be tailored in a number of manners for systems having different capabilities that are more or less suitable for different applications.

The controller 302 may be in electronic communication with the image data acquisition subsystem 301 or other components of the system 300. The controller 302 may be configured according to any of the embodiments described herein. The controller 302 also may be configured to perform other functions or additional steps using the output of the image data acquisition subsystem 301 or using images or data from other sources.

An additional embodiment relates to a non-transitory computer-readable medium storing program instructions executable on a controller for performing a computer-implemented method defocus detection, as disclosed herein. In particular, as shown in FIG. 5, the controller 302 can include a memory in the electronic data storage unit 304 or other electronic data storage medium with non-transitory computer-readable medium that includes program instructions executable on the controller 302. The computer-implemented method may include any step(s) of any method(s) described herein. For example, the controller 302 may be programmed to perform some or all of the steps of FIG. 1. In an instance, the processor 303 in the controller 302 may be programmed to receive a first wafer image and a second wafer image. The first wafer image is of a first wafer layer of the multi-layered wafer. The second wafer image is of a second wafer layer disposed on the first wafer layer of the multi-layered wafer. The second wafer image and the first wafer image are at a same planar location on the multi-layered wafer. A first difference image is calculated between the first wafer image and the second wafer image thereby reducing wafer noise. One or more defects are identified based on the first difference image.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), SSE (Streaming SIMD Extension), or other technologies or methodologies, as desired.

In another embodiment, the controller 302 may be communicatively coupled to any of the various components or sub-systems of system 300 in any manner known in the art. Moreover, the controller 302 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the controller 302 and other subsystems of the system 300 or systems external to system 300.

In some embodiments, various steps, functions, and/or operations of system 300 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single controller 302 (or computer system) or, alternatively, multiple controllers 302 (or multiple computer systems). Moreover, different sub-systems of the system 300 may include one or more computing or logic systems. Therefore, the above description should not be interpreted as a limitation on the present disclosure but merely an illustration.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

Each of the steps of the method may be performed as described herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

As used herein, "first" and "second" are used to differentiate various features. A consecutive order is not implied, though in some instances "first" may come directly before "second."

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system for defect identification in a multi-layered wafer comprising:
   an image data acquisition subsystem; and
   a controller in electronic communication with the image data acquisition subsystem, wherein the controller includes a processor configured to execute one or more software modules, the one or more software modules configured to:
   receive a first wafer image and a second wafer image, wherein the first wafer image is of a first wafer layer of the multi-layered wafer, wherein the second wafer image is of a second wafer layer disposed on the first wafer layer of the multi-layered wafer, and wherein the second wafer image and the first wafer image are at a same planar location on the multi-layered wafer;
   calculate a first difference image between the first wafer image and the second wafer image thereby reducing wafer noise; and
   identify one or more defects based on the first difference image;
   the one or more software modules are further configured to:
   receive a first reference image corresponding to the first wafer layer at a different planar location on the multi-layered wafer from that of the first wafer image and the second wafer image;
   calculate a second difference image between the first reference image and the first wafer image;
   receive a second reference image corresponding to the second wafer layer at a different planar location on the multi-layered wafer from that of the first wafer image and the second wafer image;
   calculate a third difference image between the second reference image and the second wafer mage; and
   calculate a fourth difference image between the second difference image and the third difference image;
   the one or more software modules are further configured to compare the fourth difference image against the first difference image to verify presence of the one or more defects.

2. The system of claim 1, wherein the image data acquisition subsystem is configured to perform a wafer scan.

3. The system of claim 1, wherein the one or more software modules are further configured to:
   compare a contrast difference between the first wafer image and the second wafer image; and
   apply dynamic compensation to either the first wafer image or the second wafer image if the contrast difference exceeds a predetermined threshold.

4. The system of claim 1, wherein the one or more software modules are further configured to align the second wafer image with the first wafer image based on a wafer design file.

5. The system of claim 1, wherein a first wafer scan is of an entirety of a surface of the first wafer layer, wherein the first wafer image is only a fraction of the entirety of the surface, and wherein the one or more software modules are further configured to select a fraction of the entirety of the surface based on the location of the second wafer image.

* * * * *